(12) United States Patent
Gonia

(10) Patent No.: US 7,302,959 B2
(45) Date of Patent: Dec. 4, 2007

(54) LOW-POWER WIRELESS INFLATABLE BLADDER DAMPER FOR FORCED AIR HEATING, VENTILATION, AND AIR CONDITIONING SYSTEMS

(75) Inventor: Patrick S. Gonia, Maplewood, MN (US)

(73) Assignee: Honeywell International Inc., Morristown, NJ (US)

( * ) Notice: Subject to any disclaimer, the term of this patent is extended or adjusted under 35 U.S.C. 154(b) by 234 days.

(21) Appl. No.: 10/933,148

(22) Filed: Sep. 1, 2004

(65) Prior Publication Data

US 2006/0042695 A1 Mar. 2, 2006

(51) Int. Cl.
*G05D 7/06* (2006.01)

(52) U.S. Cl. .......... 137/2; 137/14; 137/487.5; 251/61.1; 251/5; 92/92; 236/49.4; 236/51; 454/333

(58) Field of Classification Search ........... 137/12, 137/14, 487.5; 251/61, 61.1; 92/92; 236/49.1, 236/49.2, 49.3, 49.4, 51; 454/257, 258, 333
See application file for complete search history.

(56) References Cited

U.S. PATENT DOCUMENTS

| | | | |
|---|---|---|---|
| 4,006,754 A * | 2/1977 | Houston | 137/614.21 |
| 4,211,363 A * | 7/1980 | Osheroff | 236/49.4 |
| 4,268,005 A * | 5/1981 | Raftis et al. | 251/5 |
| 4,662,269 A * | 5/1987 | Tartaglino | 454/255 |
| 4,742,956 A * | 5/1988 | Zelczer | 236/46 R |
| 4,783,045 A | 11/1988 | Tartaglino | |
| 5,016,856 A | 5/1991 | Tartaglino | |
| 5,114,070 A * | 5/1992 | Lilja et al. | 236/49.3 |
| 5,123,592 A * | 6/1992 | Desmarais et al. | 236/49.3 |
| 5,158,230 A * | 10/1992 | Curran | 236/49.4 |
| 5,277,397 A | 1/1994 | Tartaglino | |
| 5,348,270 A | 9/1994 | Dinh | |
| 5,779,538 A * | 7/1998 | Jardinier | 454/256 |
| 5,868,313 A * | 2/1999 | Weng | 236/49.3 |
| 5,927,599 A * | 7/1999 | Kath | 236/47 |
| 6,364,211 B1 | 4/2002 | Saleh | |
| 6,568,416 B2 * | 5/2003 | Tucker et al. | 137/14 |
| 7,014,124 B2 * | 3/2006 | Gottlieb | 236/49.3 |

* cited by examiner

*Primary Examiner*—Ramesh Krishnamurthy
(74) *Attorney, Agent, or Firm*—Kris T. Fredrick

(57) ABSTRACT

A low-power, wireless, inflatable bladder damper device for controlling the flow of air through an airflow channel, and a method of operation for the same. Rather than requiring power supply and/or control wiring for operation of a wireless damper device, a low-power inflatable bladder damper device that requires no external wiring for operation can be used. A completely wireless damper device can reduce the cost of installation of damping devices in airflow channels, as well as the complexity of installation, while at the same time providing improved control of airflow throughout an airflow system.

38 Claims, 7 Drawing Sheets

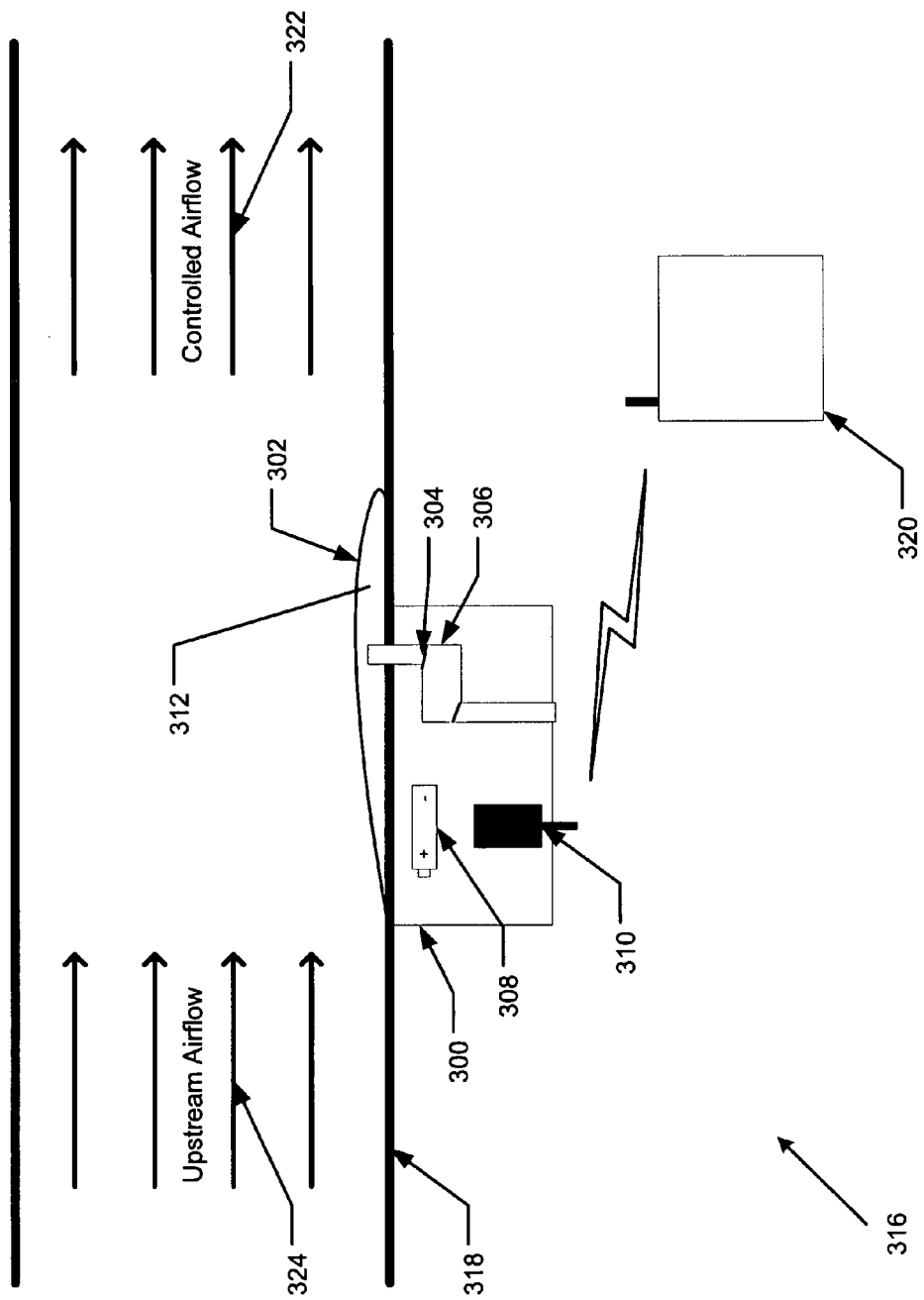

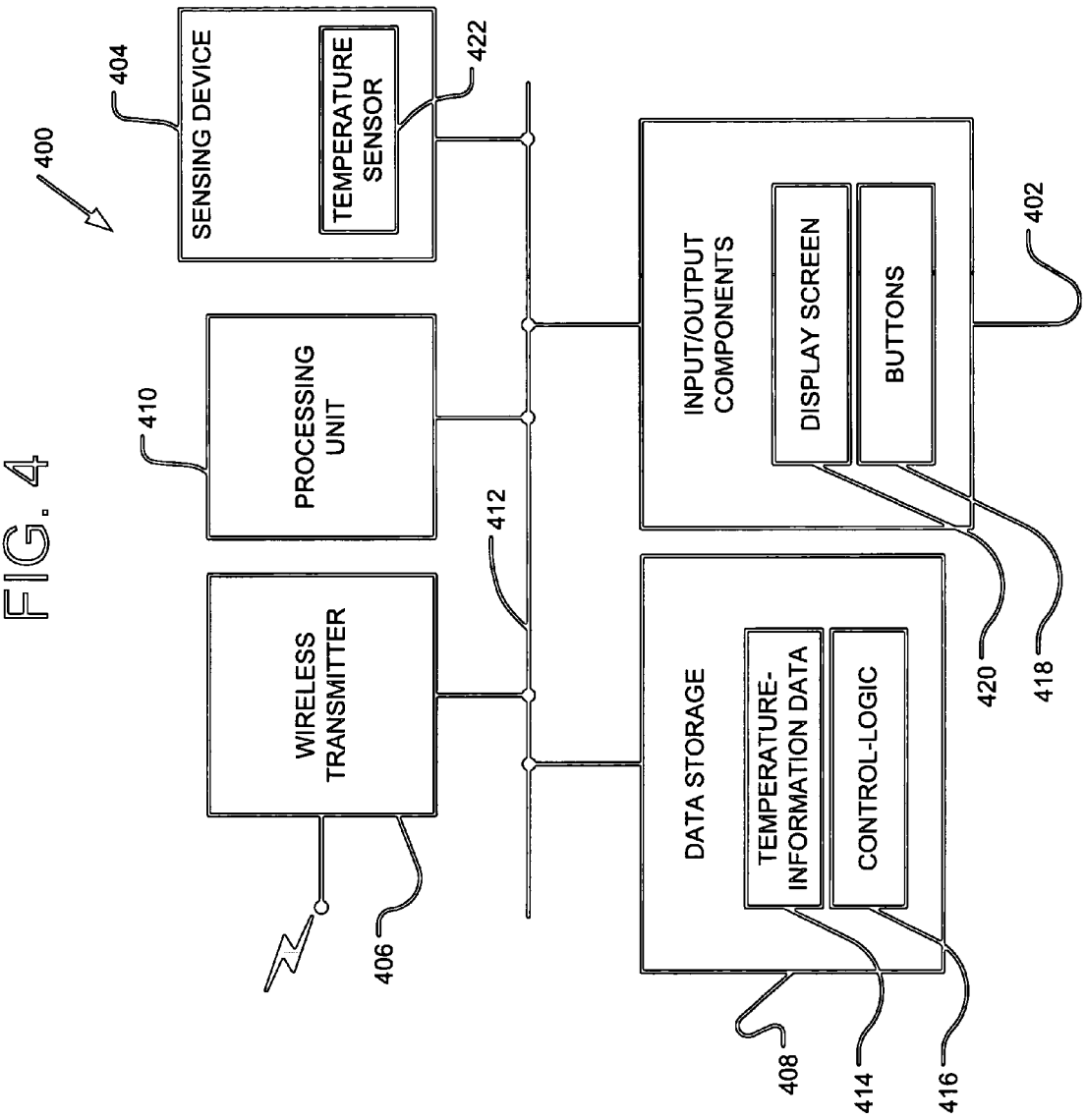

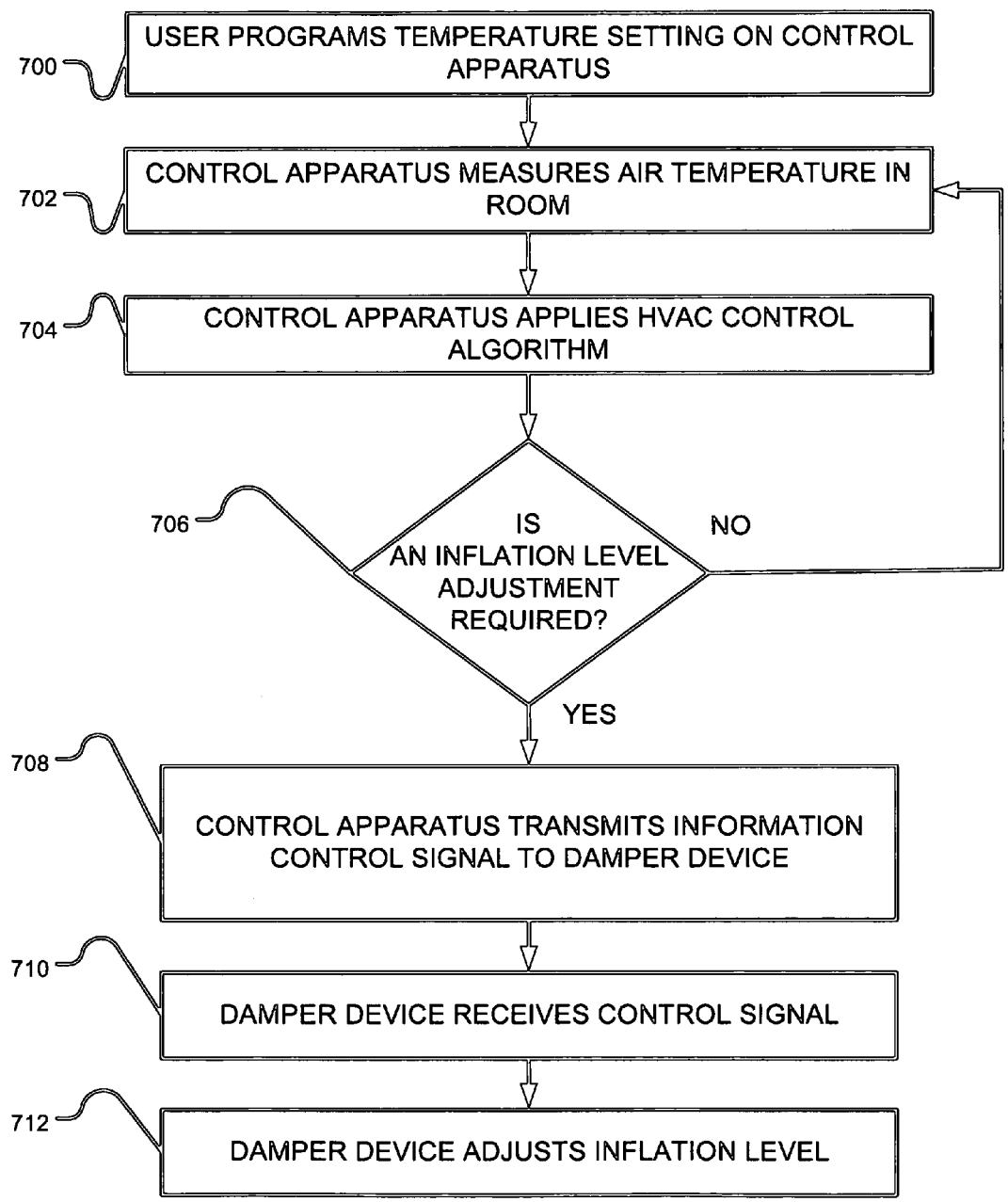

LOW-POWER WIRELESS INFLATABLE BLADDER DAMPER FOR FORCED AIR HEATING, VENTILATION, AND AIR CONDITIONING SYSTEMS

BACKGROUND

1. Field of the Invention

The present invention relates in general to the control of airflow in forced air systems, and more particularly to a low power, wireless, inflatable bladder zoning damper.

2. Description of Related Art

Dampers have applications in airflow systems to control the flow of air throughout a system. They may be used in, for example, airflow channels (i.e. ducts) of a heating, ventilation, and air conditioning (HVAC) system in a building or automobile to improve the control of air temperature at various locations. Such improved control can enhance the effectiveness and efficiency of the airflow system by more effectively utilizing the system to control the temperature of a room and/or the temperature of portions of a larger room.

Dampers previously used in HVAC systems include those that are activated and controlled by a user manually modifying the position of the damper at the location of the damper in the airflow system. Such dampers include butterfly plates and vane dampers. This type of damper system can be undesirable because it requires the user to physically access dampers at their locations in the airflow system in order control the flow of air throughout the system. Dampers in certain locations in the airflow system may not be easily accessible, and in large and/or complex systems, it may be inefficient to require each damper to be physically accessed at its location in the airflow system and manually activated and controlled to optimize airflow in the system. Additionally, such systems do not permit airflow to be responsively controlled by a control system to continually optimize system effectiveness and efficiency.

Other types of dampers that have been used in HVAC systems include electromechanically activated dampers that can be controlled remotely by a user or by a programmable control system. Dampers used in such systems include electronically operated butterfly plates, vane dampers, and electronically inflated air bladders. These types of systems typically use an electric motor, an electronic pump, a high-pressure air line with an electronically operated valve, etc. to control damper position. Such a system may be undesirable because special wiring might be required for activation and control of the damper, as well as for connection to a power supply (i.e. electrical system). Additionally, for dampers using high-pressure air lines, such lines must be installed in or near the airflow system and must be attached to each damper device.

Another type of damper that has been used in airflow systems is a wirelessly controlled damper system that may be controlled using a wireless control device. Wirelessly controlled damper systems provide added convenience because no wiring is required to activate or control the damper. However, such systems typically still require wiring for connecting the damper with an external power supply that is able to provide sufficient power to drive the electric motor, electric pump, etc. that controls the damper's position, as well as to power the wireless damper device's wireless receiving and/or transmitting device.

One consequence of the external control/power supply wiring is that damper systems capable of responsively optimizing airflow system operation are expensive and complex to install, and as a result, may not be implemented effectively, if at all. Thus, a wireless damper design that would not require external control/power supply wiring would be desirable.

SUMMARY

An exemplary embodiment provides a damper device for controlling airflow in a controlled airflow system. The damper device is comprised of an inflatable bladder, a valve coupled to the inflatable bladder, a micro-pump coupled to the valve, a wireless signal device arranged to receive wireless signals, and a self-contained power source. The inflatable bladder has an inflation level that is adjustable to restrict varying amounts of airflow in an airflow channel.

These as well as other aspects and advantages of the present invention will become apparent to those of ordinary skill in the art by reading the following detailed description, with appropriate reference to the accompanying drawings.

BRIEF DESCRIPTION OF THE DRAWINGS

An exemplary embodiment of the present invention is described herein with reference to the following drawings, wherein:

FIG. 3 is a simplified block diagram illustrating components of an exemplary HVAC airflow control system that may be used in accordance with the exemplary embodiment;

FIG. 4 is a block diagram illustrating components of an exemplary control apparatus that may be used in accordance with the exemplary embodiment;

FIG. 7 is a flowchart illustrating a functional process flow in accordance with the exemplary embodiment.

DETAILED DESCRIPTION

In view of the wide variety of embodiments to which the principles of the present invention can be applied, it should be understood that the illustrated embodiments are exemplary only, and should not be taken as limiting the scope of the present invention.

Figure 1:
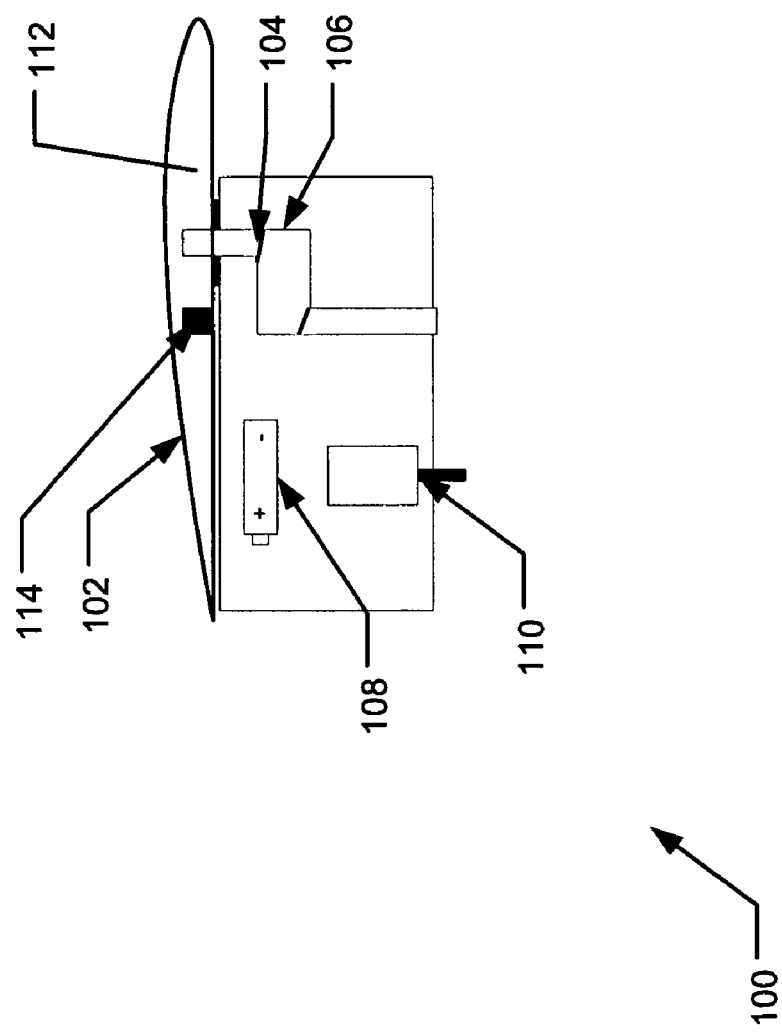
FIG. 1 is a block diagram illustrating components of an exemplary damper device that may be used in accordance with the exemplary embodiment.
Figure 2B:
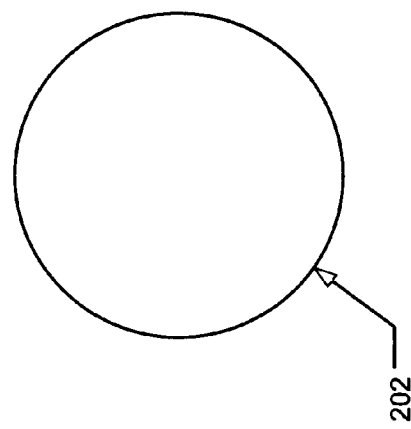
FIGS. 2A-2D are side views and head-on views of inflated bladders that can be used in accordance with the exemplary embodiment.
Figure 2D:
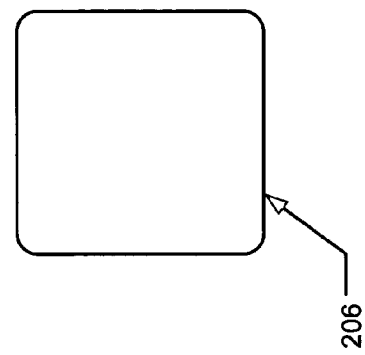
Figure 2A:
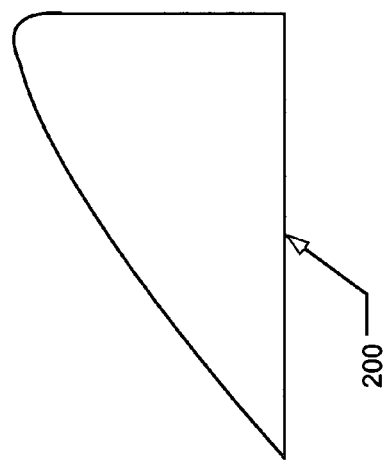
Figure 2C:
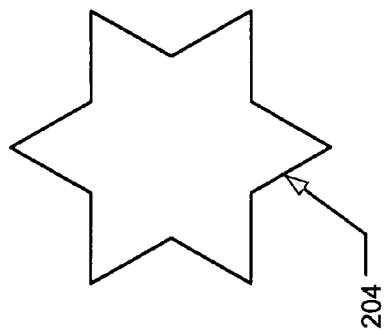

FIG. 1 is a block diagram of a damper device 100 in accordance with an exemplary embodiment of the present invention. As illustrated, the damper device 100 may include an inflatable bladder 102, a valve 104 coupled to the inflatable bladder 102, a micro-pump 106 coupled to the valve 104, a self-contained power source 108, a wireless device 110, and fill-air 112 contained within the inflatable bladder 102. While electrical connections would likely exist between the self-contained power source 108 and the valve 104, the micro-pump 106, and the wireless device 110, such connections are omitted from FIG. 1 for purposes of clarity.

In an exemplary embodiment, the inflatable bladder 102 can be used to restrict airflow through an airflow channel, and may be fabricated from any substantially airtight, deformable or elastic material, such as a rubberized material. Such materials allow the inflatable bladder 102 to have various inflation levels as the bladder 102 is inflated or deflated. An inflatable bladder 102 may take various shapes suitable for use in an airflow channel in which a user installs the damper 100.

FIG. 2 Illustrates several examples of possible shapes for the inflatable bladder 102. FIG. 2A is a side view of an inflatable bladder and FIGS. 2B-2D are head-on views, as would be presented to airflow upstream from the inflatable bladder 102 in an airflow channel. FIG. 2A shows an elongated triangular inflatable bladder 200. An elongated triangular bladder 200 allows for at least partial restriction of upstream airflow (airflow from the left of the bladder) while minimizing the disruption to the non-restricted airflow within the airflow channel. The elongated triangular inflatable bladder 200 may be a used in a variety of airflow system configurations, however, it is particularly well suited for use in airflow systems utilizing rectangular or square airflow channels (i.e. ducts). FIG. 2B shows a spherical inflatable bladder 202. A spherical inflatable bladder 202 may also be used in a variety of airflow system configurations, however, it is particularly well suited for use in airflow systems utilizing circular airflow channels. FIG. 2C shows a star shaped inflatable bladder 204, which may be well suited for use in airflow channels of a wide variety of shapes. FIG. 2D shows a rounded-edge rectangular inflatable bladder 206. A rounded-edge rectangular inflatable bladder 206 may be particularly well suited for use in airflow systems utilizing rectangular airflow channels. Many other inflatable bladder shapes are possible as well.

Turning back to FIG. 1, damper device 100 could use the valve 104, coupled to the inflatable bladder 102, to control the passage of air through an opening in the inflatable bladder 102 to adjust the inflatable bladder's inflation level. The self-contained power source 108 could power the valve 104 and the valve could have a closed mode requiring a low power, and an open mode requiring relatively higher power. When the valve 104 is in the open mode, air might flow into or out of the inflatable bladder 102, thereby adjusting the inflation level of the inflatable bladder 102. When the valve 104 is in the closed mode, it could prevent air from passing through the opening in the inflatable bladder 102, thereby fixing the inflation level of the inflatable bladder 102 at a relatively constant state.

The damper device 100 could use the micro-pump 106 shown in FIG. 1 to force air into or out of the inflatable bladder 102, and the self-contained power source 108 could power the micro-pump 106.

The damper device 100 can use the self-contained power source 108 to power the wireless device 110 shown in FIG. 1, allowing the wireless device 110 to receive control information from one or more wireless transmitting devices. The control information received by the wireless device 110 might include control commands that could cause the damper device to adjust the inflation level of the inflatable damper 102. Alternatively, the control information could contain information (i.e. downstream temperature readings) needed for the damper 100 to make a determination of whether the inflation level of the inflatable bladder 102 requires adjustment. This determination could be made using programmed control logic and/or a microcontroller in conjunction with standard HVAC control algorithms, for instance. However, additional processing capabilities at the damper device 100 will also likely require a larger self-contained power source 108 and/or more frequent power source 108 replacement.

In an alternative embodiment, the wireless device 110 could also be a wireless transmitter. The damper device 100 could use the wireless transmitter to transmit operation data regarding the damper device 100 to one or more wireless receivers. Information that may be communicated might include the damper device's 100 remaining battery life, and/or the level of inflation of the inflatable bladder 102, as well as other information. This information could be used for damper device 100 diagnostic purposes, for energy saving purposes, or for maintenance scheduling purposes, as well as for other purposes.

The self-contained power source 108 shown in FIG. 1 preferably powers all elements of the damper device 100, including the valve 104, the micro-pump 106, and the wireless device 110. As a result, it is desirable for these devices to be low power devices in order to reduce the size of the self-contained power source 108, and increase its life. The smaller the self-contained power source 108 is, the less expensive and smaller the damper device 100 could be, which could enable the device to be easier to install. In addition, the longer the life of the self-contained power source 108, the less frequently the power-source 108 would have to be replaced, thereby reducing maintenance costs. In one embodiment, the self-contained power source 108 could be two standard AA batteries, for instance, electrically connected to the valve 104, the micro-pump 106, and the wireless device 110.

In addition to using low power devices in the damper device 100, the damper device 100 could use power management features to reduce the size of and frequency of replacement of the self-contained power source 108. Such power management techniques could include a damper 100 sleep mode. The sleep mode could include duty cycle sleeping with periodic brief wakeups, allowing the damper device's wireless device 110 to receive wireless control information and adjust the inflation level of the inflatable bladder 102. Additionally, the damper device 100 could adjust the inflation level of the inflatable bladder 102 in small increments to conserve power. Other power management techniques are possible as well.

As shown in FIG. 1, in one embodiment of the present invention the damper device 102 can include at least one inflation sensor 114 (i.e. a pressure sensor) for determining the inflation level of the inflatable bladder 102. Using such a sensor 114, the damper device 100 could have programmed upper and lower inflation level limits to prevent over-inflation or needless valve 104 cycling and/or needless micro-pump 106 operation.

FIG. 3 is a block diagram of an HVAC system 316 having the damper device 100 of FIG. 1, installed in an airflow channel 318 (i.e. air duct). The damper device 300 can be used to control the airflow downstream from the damper device 300 (i.e. controlled airflow 322) by restricting, to various degrees, the upstream airflow 324 at the location of the damper device 300 in the HVAC system 316. In one embodiment, as shown in FIG. 3, the HVAC system 316 may further include a control apparatus 320.

Referring to FIG. 4, a block diagram of an exemplary control apparatus 400 is shown. As illustrated, the control apparatus 400 may include input/output components 402 (i.e. a user interface), a sensing device 404, a wireless transmitter 406, data storage 408, and a processing unit 410, all coupled to at least one bus, illustrated as a bus 412. In an exemplary embodiment, the data storage may store data, including temperature-information data 414, and computer instructions, including control-logic 416, executable by the processing unit 410.

The input/output components 402 of the control apparatus 400 can allow a user to program the control apparatus with at least one desired temperature level, for instance. As such, the input/output components 402 might include buttons 418 as an input mechanism, and a display screen 420 as an output mechanism. The control apparatus 400 might also comprise other or additional input and/or output components, or fewer input and/or output components than shown in FIG. 4.

The sensing device 404 shown in FIG. 4 has a temperature sensor 422 for measuring air temperature. However, in another embodiment, the sensing device 404 could be include at least one temperature sensor, humidity sensor, carbon monoxide sensor, carbon dioxide sensor, or volatile organic compound sensor, or a combination thereof, for measuring actual air property values. Other combinations of sensors and types of sensors are possible as well.

The control apparatus can use the wireless transmitter 406 shown in FIG. 4 to transmit control information to the wireless device 310 of the damper device 300. The control information transmitted by the wireless transmitter 406 might include control commands that could cause the damper device to adjust the inflation level of the inflatable bladder 302. Alternatively, the control information could contain sensor measurement information (i.e. downstream temperature readings) needed for the damper 300 to make a determination of whether the inflation level of the inflatable bladder 302 requires adjustment.

In another embodiment, the wireless transmitter 406 could also be a wireless receiver. The wireless transmitter/receiver 406 could receive operation data regarding the damper device 300. The control apparatus 400 could use such information to monitor damper performance indicators, such as estimated self-contained power source 308 life remaining. Such information could be useful for damper 300 maintenance and operation troubleshooting.

The stored temperature-information data 414 shown in FIG. 4 can define a plurality of user-programmed desired temperature levels, for instance, corresponding to various times of day. By way of example, the temperature-information data 414 may be contained in a table having a first column containing a temperature, a second column containing a start time of day, a third column containing an end time of day.

The control-logic 416 shown in FIG. 4 may contain instructions for monitoring air property levels using the sensing device 404, and for determining when the inflation level of the inflatable bladder 302 requires adjustment. For example, the control logic 416 could use the programmed air temperature level and the measured air temperature in conjunction with standard HVAC control algorithms to make such a determination. In an alternative embodiment, the determination to adjust the inflation level of the inflatable bladder 302 could be made at the bladder device 300.

Although the control apparatus 400 is shown as a single physical device in FIG. 4, the various components of the apparatus 400 could also be separate, discrete devices in direct communication, either wirelessly or otherwise, or indirect communication (i.e. via one or more intermediate devices). Additional or fewer devices are possible as well.

Turning back to FIG. 3, the inflatable bladder 302 shown in FIG. 3 is substantially deflated, and as a result, contains only a small amount of fill-air 312. This permits the upstream airflow 324 to be substantially equivalent to the controlled airflow 322. As a result, the controlled airflow 322 is not substantially inhibited by the damper device 300 and the at least one air property being monitored by the sensor device at the outlet of the airflow system, for instance, may be increased or decreased more quickly depending on what effect the air in the airflow system has on that air property.

Figure 5:
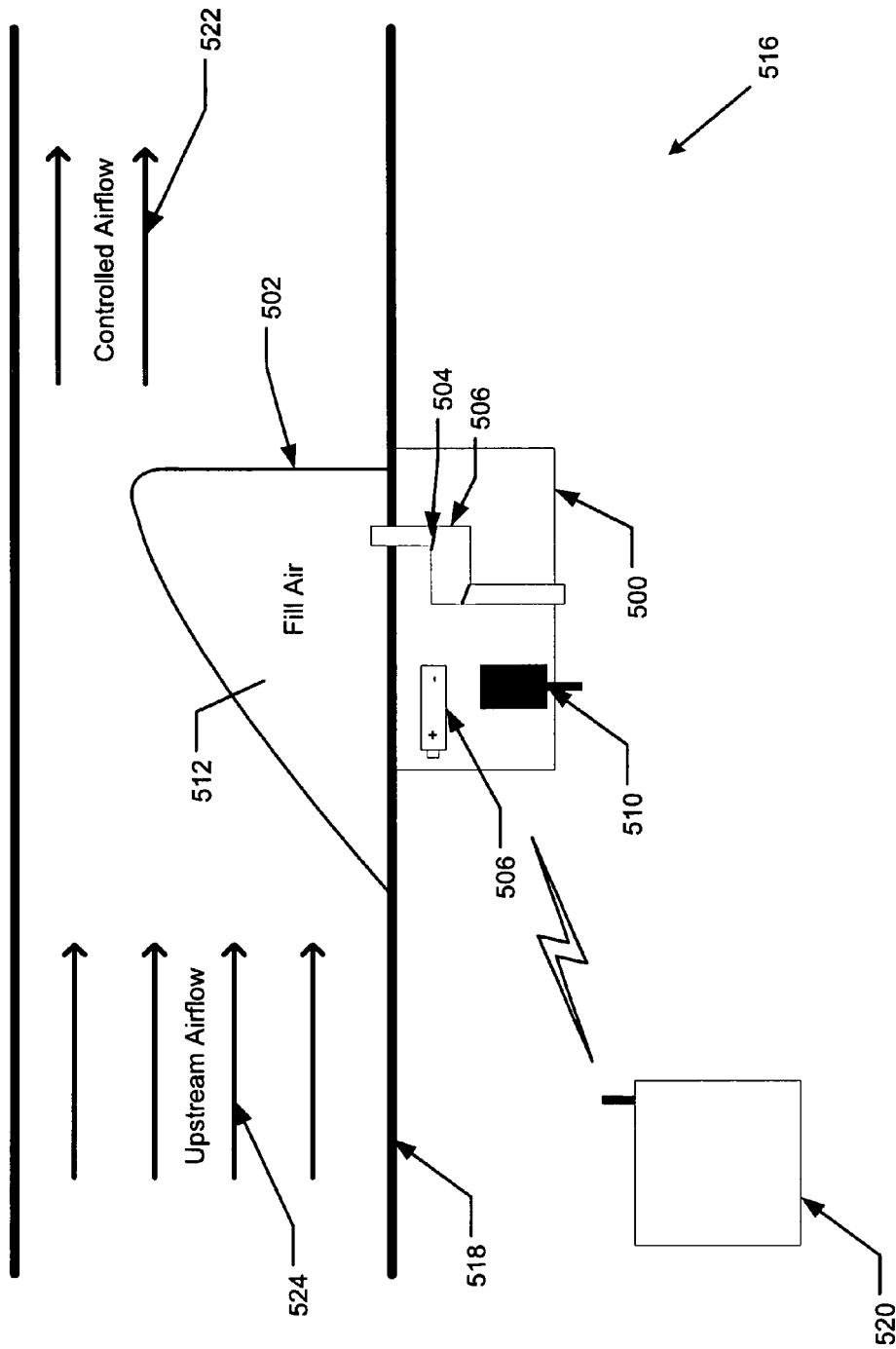
FIG. 5 is a simplified block diagram illustrating components of an exemplary HVAC airflow control system that may be used in accordance with the exemplary embodiment.

FIG. 5 is a block diagram of the HVAC system of FIG. 3, but with the inflatable bladder 502 partially inflated with fill-air 512. The partially inflated bladder 502 restricts a portion of the upstream airflow 524 from reaching areas downstream from the wireless damper device 500, resulting in a controlled airflow 522 that is restricted. As a result, the air in the areas downstream from the wireless damper device 500 that receive the controlled air flow 522 are heated or cooled less quickly, depending upon whether the UVAC system is running in a heating or cooling mode.

In an alternative embodiment, a plurality of damper devices 500 can be implemented in a plurality of air channels in an airflow system with one or more sensing devices 404. HVAC systems with multiple damper devices 500 and/or a plurality of temperature sensing devices, for instance, could provide for better temperature control in various locations in a building.

For systems with multiple damper devices 500, in order to allow a wireless transmitter 406 to communicate particular information with only certain damper devices 500 within range of the wireless transmitter 406, the wireless transmitter 406 could send specifically designated transmissions that would only be acted upon by damper devices 500 that have been configured to act on the specifically designated transmitted message. In one exemplary embodiment each damper device 500 could be programmed with a code (i.e. 1, 2, 3, etc.) that the wireless transmitter 406 could use to communicate with only damper devices 500 set to that code. In another embodiment, wireless transmission frequency could be used to allow the wireless transmitter 406 to communicate particular information with only certain damper devices 500 set to receive transmissions at only certain frequencies. Other transmission specific designation methods are possible as well.

Embodiments of the present invention may either be installed in existing airflow systems or designed into new airflow systems. Installation in an existing system could involve cutting a small hole into an airflow channel 518, feeding a deflated inflatable bladder 502 into the hole, and securing the damper device 500 to the outside of the air channel. Designing an embodiment of the present invention into a new airflow system could involve creating a specialized section of airflow channel specifically designed to accommodate an inflatable damper device 500, or simply cutting a hole into a section of a standard airflow channel, similar to what can be done with existing systems.

Figure 6:
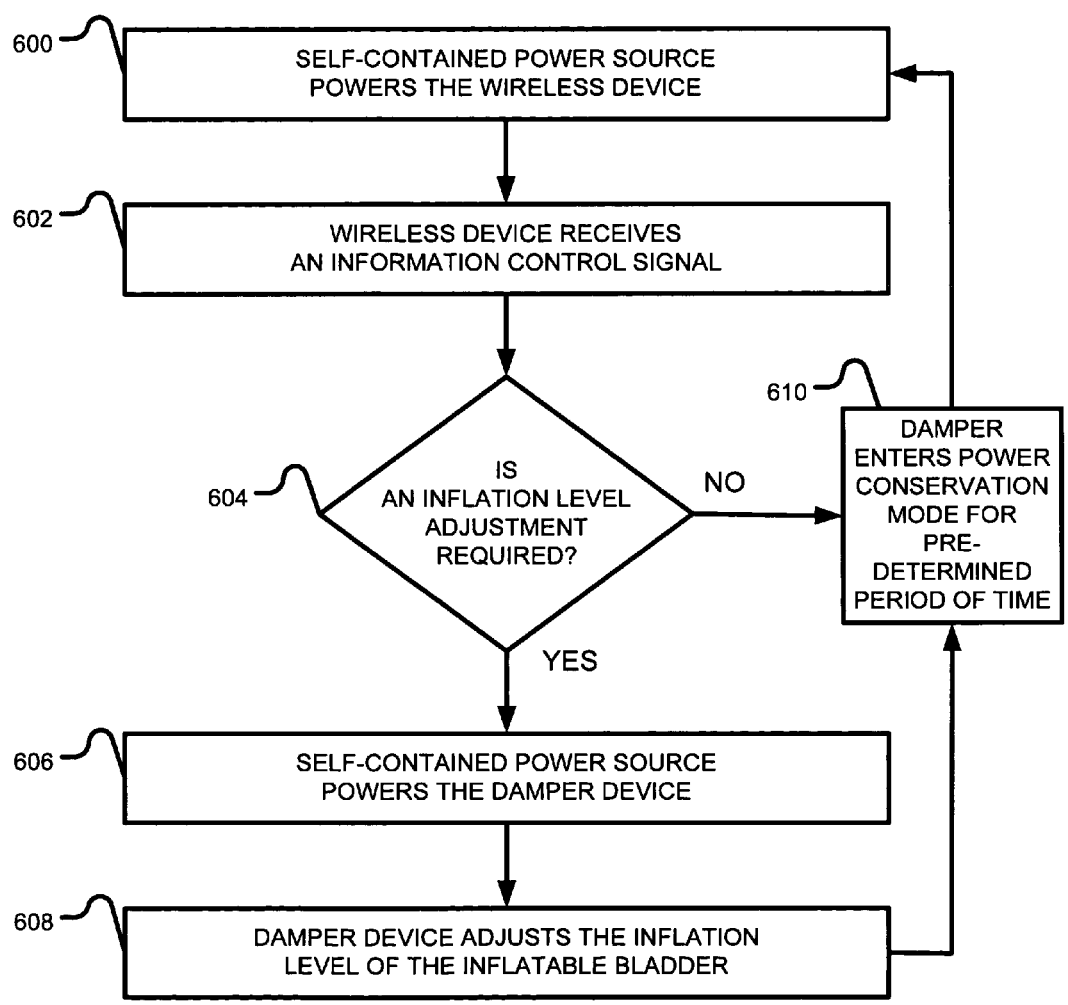
FIG. 6 is a flowchart illustrating a functional process flow in accordance with the exemplary embodiment.

FIG. 6 is a flow chart that illustrates exemplary functions performed by the damper device 500 in accordance with an exemplary embodiment of the present invention. At step 600, the damper device powers the wireless device 510 using the self-contained power source 506 to enable the wireless device 510 to receive control information.

While the self-contained power source 506 is powering the wireless device 510, the wireless device 510 receives a signal containing control information at step 602. The control information can contain a command for the damper device to further inflate or deflate the damper device's 500 inflatable bladder 502, or to leave the inflation level unchanged. Alternatively, the information control signal can contain only air property measurement data, allowing the damper device 500 to determine whether to adjust the inflation level of the inflatable bladder 502. Other and/or additional information could also be contained in the control information.

After the damper device 500 receives the control information, a determination is made at step 604 whether or not to adjust the inflation level of the inflatable bladder 502. If the control information received is a command to increase, decrease, or maintain the inflation level of the inflatable bladder 502, the bladder device 500 simply acts on that command. If however, the control information is only air property measurement data, the bladder device 500 must make a determination whether to adjust the inflation level of the inflatable bladder 502, using, for example, standard control algorithms and a microprocessor.

If an adjustment to the inflation level of the inflatable bladder 502 is required, at step 606, the self-contained power source 506 powers the damper device 500 to effect the desired change. If at step 604 it is determined that a decrease in the inflation level of the inflatable bladder is required to effect such a decrease, the damper device 500 might open the valve 504 for a period, thus releasing an amount of fill-air 512 from inside the inflatable bladder 502 to the relatively lower pressure ambient air. The valve 504 could either be left open for a specific length of time to allow an amount of fill-air 512 to escape from the inflatable bladder 502, or the valve 504 might be repeatedly cycled, thereby releasing a small amount of fill-air 512 during each cycle to achieve the desired reduction in the inflation level of the inflatable bladder 502.

To decrease further the inflation level of the inflatable bladder 502, the damper device 500 might also activate the micro-pump 506. With the valve 504 in an open mode, the micro-pump 506 could be activated to more quickly lower the inflation level of the inflatable bladder 502, or it may be used only when the air pressure of the fill-air 512 in the inflatable bladder 502 approaches that of the ambient air, thus necessitating the use of the micro-pump 506 to remove additional fill-air 512 from the inflatable bladder 502. Additionally, with the valve 504 in an open mode, the damper may use the micro-pump 506 to increase the inflation level of the inflatable bladder 502 by pumping ambient air into the inflatable bladder 502. Once the micro-pump 506 has filled the inflatable bladder 502 with an adequate amount of ambient air to achieve the desired inflation level of the inflatable bladder 502, the damper device 500 may turn the micro-pump 506 off and put the valve 504 in closed mode, thus trapping the fill-air 512 in the inflatable bladder 502.

Alternatively, to maintain the inflation level of the inflatable bladder 502, the valve 504 could remain closed, sealing the opening in the inflatable bladder, and requiring only a relatively low power. After the inflation level of the inflatable bladder 502 has been adjusted, or it has been determined that no adjustment is required, the damper device 500 may enter a power conservation mode, at step 610, for a predetermined period of time, at the end or which the process will start again at step 600.

FIG. 7 is a flow chart that illustrates exemplary functions performed by an HVAC airflow control system 516 in accordance with an exemplary embodiment of the present invention. At step 700, a user programs the control apparatus 520 with at least one desired air property setting, temperature is used in the present embodiment, however, additional and/or other desired air property settings could be programmed as well. The user could program the control apparatus 520 by using the apparatus' buttons 418 and display screen 420 for feedback. Other input/output components 402 for programming are possible as well. During programming, the control apparatus 520 could store the programmed temperature settings in the temperature-information data 414 stored in the apparatus' data storage 408.

After the user has programmed the control apparatus 520 with a temperature setting, a temperature sensor 422, of the sensing device 404 measures the temperature of the air immediately surrounding the sensor and communicates the measurement to the sensing device 404 at step 702. In other embodiments, other types of air property sensors 422, such a humidity sensor, a carbon monoxide sensor, a carbon dioxide sensor, and a volatile organic compound sensor could alone, or in combination, measure actual air properties in close proximity to the sensor.

After the sensor 422 measures the air temperature, the processing unit 410 executes the control-logic 416 at step 704 to compare the measured air temperature to the programmed air temperature. The control-logic 416 can do this by applying standard HVAC control algorithms, for instance, to the measured and programmed temperatures. If the control-logic determines that no inflation level adjustment is required at step 706, the process starts over at step 702. However, if the control-logic 416 does determine that an inflation level adjustment is required, it can cause its wireless transmitter 406 to transmit a control signal containing control information to the wireless device 510 of the damper device 500. The control information can include a command to increase or decrease the inflation level of the inflatable bladder 502. Alternatively, the control apparatus 520 could simply send the measured and programmed temperature information to the wireless device 510 of the inflatable bladder, and the decision to adjust the inflation level of the inflatable bladder 502 could be made at the damper device 500. The damper device 500 receives the control signal at step 710 and if required, adjusts the inflation level of the inflatable bladder at step 712, using the methods discussed above.

By way of example, when the HVAC system is being used for heating, typically if the measured air temperature is higher than the programmed temperature, the control apparatus 520 wirelessly transmits a signal to an upstream damper device 500 indicating that the inflation level of the wireless damper device's inflatable bladder 502 should be increased in order to restrict a portion of the upstream airflow 524 from reaching the location downstream from the wireless damper device 500 where the temperature sensor 422 is located.

Conversely, when in heating mode, if the temperature sensor 422 measures an air temperature and finds it to be lower than the programmed temperature, the control apparatus 520 can transmit a wireless signal to the upstream damper device 500 indicating that the inflation level of the wireless damper device's inflatable bladder 502 should be decreased in order to allow additional heated upstream airflow 524 to reach the location of the temperature sensor 422 downstream from the wireless damper device 500, thus allowing the air located in the area of the air temperature sensor 422 to be warmed more quickly and efficiently to the programmed temperature. If, however, the measured air temperature is substantially similar to the programmed air temperature, the control apparatus 520 may send a signal indicating that the damper device 500 need not adjust the inflation level of the inflatable bladder 502, or in another embodiment, the control apparatus 520 may send no signal at all.

CONCLUSION

Prior attempts to control airflow automatically in forced air systems have typically involved dampers requiring wired power supplies, which tended to result in high installation expense and complexity. The low power, wireless, inflatable bladder damper design, however, provides for a completely wireless damper system. This wireless damper may be useful in such applications as large and/or complex HVAC systems, for example. Further, this wireless damper design allows a control device to continually monitor and optimize the performance of a forced air system. Thus, if used in a large office building, for example, the low power wireless design could allow a user to control temperature more efficiently and effectively throughout the building. Other applications may include home and vehicle use.

An exemplary embodiment of the present invention has been described above. Those skilled in the art will understand, however, that changes and modifications may be made to this embodiment without departing from the true scope and spirit of the present invention, which is defined by the claims.

What is claimed is:

1. A damper device for restricting airflow in an HVAC airflow channel, the damper device comprising:
    an inflatable bladder having an inflation level, wherein the inflatable bladder is located in the HVAC airflow channel;
    a valve coupled to the inflatable bladder;
    a pump co-located with and coupled to the valve, wherein the pump and the valve adjust the inflation level of the inflatable bladder to restrict varying amounts of airflow in the airflow channel;
    a wireless device for receiving control information; and
    a self-contained power source for powering the valve, the pump, and the wireless device, wherein the damper device houses the valve, the pump, the wireless device, and the self-contained power source, and wherein the damper device is secured to the airflow channel.

2. The damper device of claim 1 wherein an increase in the inflation level of the inflatable bladder increases the restriction of air through the airflow channel caused by the inflatable bladder.

3. The damper device of claim 1 wherein a decrease in the inflation level of the inflatable bladder decreases the restriction of air through the airflow channel caused by the inflatable bladder.

4. The damper device of claim 1 wherein the inflation level may be increased by operation of the pump.

5. The damper device of claim 1 wherein the inflation level may be decreased by moving the valve to an at least partially open position.

6. The damper device of claim 5 wherein the inflation level may be further decreased by operation of the pump.

7. The damper device of claim 1 wherein in response to receiving a wireless signal, the inflation level of the inflatable bladder is adjusted.

8. The damper device of claim 1 wherein the inflatable bladder is fabricated from a rubberized material.

9. The damper device of claim 1 wherein the valve has a closed position requiring a first amount of power, and an open position requiring a relatively higher amount of power.

10. The damper device of claim 1 wherein the wireless signal device is further arranged to transmit wireless signals.

11. The damper device of claim 10 wherein the wireless device is further arranged to transmit damper operation information.

12. The damper device of claim 1 wherein the self-contained power source comprises at least one battery.

13. The damper device of claim 12 wherein the at least one battery comprises at least one AA battery.

14. The damper device of claim 1 further comprising at least one inflation sensor for determining the inflation level of the inflatable bladder.

15. The damper device of claim 14 wherein the at least one inflation sensor comprises a pressure sensor.

16. The damper device of claim 14 wherein the inflatable bladder has a maximum inflation level to prevent over-inflation.

17. The damper device of claim 14 wherein the inflatable bladder has a minimum inflation level to prevent unproductive damper operation.

18. The damper device of claim 1 wherein the damper can be installed in the airflow channel by inserting the inflatable bladder through a hole in the airflow channel.

19. The damper device of claim 1 wherein the damper device is used in an HVAC system for controlling airflow.

20. An airflow control system comprising:
    a damper device comprising:
        an inflatable bladder having an inflation level, wherein the inflatable bladder is located in an airflow channel;
        a valve coupled to the inflatable bladder;
        a pump co-located with and coupled to the valve, wherein the pump and the valve adjust the inflation level of the inflatable bladder to restrict varying amounts of airflow in the airflow channel;
        a wireless device for receiving control information;
        a self-contained power source for powering the valve, the pump, and the wireless device, wherein the damper device houses the valve, the pump, the wireless device, and the self-contained power source, and wherein the damper device is secured to the airflow channel;
    a programmable device for programming a desired level of at least one air property measure; and
    a sensing device comprising:
        at least one sensor for measuring at least one air property; and
        a wireless transmitter for sending control information to the wireless device for use in controlling the damper device;
    wherein the airflow channel is an HVAC air duct for heating or cooling a room.

21. The airflow control system of claim 20 wherein the programmable device and the sensing device are integrated into a single control apparatus.

22. The airflow control system of claim 20 wherein the damper device and the programmable device are integrated into a single apparatus.

23. The air flow control system of claim 20 wherein the wireless device is further arranged to transmit damper operation information and the wireless transmitter further comprises a wireless receiver for receiving the damper operation information from the wireless device.

24. The airflow control system of claim 20 wherein the wireless transmitter is arranged to transmit specifically designated coded wireless signals to be acted upon only by a damper device arranged to receive the specifically designated wireless signals.

25. The airflow control system of claim 24 wherein the designation is coded identifier information carried as part of the specifically designated coded wireless signals.

26. The airflow control system of claim 24 wherein the designation is a frequency of the specifically designated wireless signals.

27. The airflow control system of claim 20 wherein the at least one sensor comprises a sensor selected from the group consisting of a temperature sensor, a humidity sensor, a carbon monoxide sensor, a carbon dioxide sensor, and a volatile organic compound sensor.

28. The airflow control system of claim 20 wherein the programmable device further comprises:
- a processing unit;
- data storage; and
- control logic stored in the data storage and executable by the processing unit to control the inflation level of the inflatable bladder.

29. In an HVAC system having a damper device, the damper device including a bladder located in an airflow channel, a valve coupled to the inflatable bladder, a micro-pump co-located with and coupled to the valve, a wireless device for receiving damper control information, and a self-contained power source for powering the valve, the micro-pump, and the wireless device, wherein the damper device houses the valve, the pump, the wireless device, and the self-contained power source, and wherein the damper device is secured to the airflow channel a method for controlling airflow comprising the steps of:
- powering the wireless device using the self-contained power source so as to enable the wireless device to receive the control information;
- receiving at the wireless device the control information; and
- powering the micro-pump and the valve using the self-contained power source so as to effect an adjustment in the inflatable bladder to control air flow in the channel, wherein the channel is an HVAC air duct for heating or cooling a room.

30. The method of claim 29 further comprising the step of programming at least one air property measure for use in generating the control information.

31. The method of claim 30 further comprising the step of measuring at least one air property for use in generating the control information.

32. The method of claim 31 wherein the at least one air property is temperature.

33. The method of claim 31 wherein the at least one air property is a level of carbon dioxide.

34. The method of claim 31 further comprising the step of comparing the at least one programmed air property measure to the corresponding at least one measured air property for use in generating the control information.

35. The method of claim 34 wherein the step of comparing includes applying at least one algorithm to the at least one programmed air property measure and the corresponding at least one measured air property to generate the control information.

36. The method of claim 34 wherein the at least one programmed property is temperature and the corresponding at least one measured air property is temperature.

37. The method of claim 29 wherein the steps are performed iteratively.

38. The method of claim 29 further comprising the step of causing the damper device to enter a low-power mode for a period of time.

* * * * *